Nov. 18, 1930.   M. C. TEAGUE   1,782,107
METHOD AND APPARATUS FOR MAKING INLAID SHEET MATERIAL
Filed Jan. 26, 1924   3 Sheets-Sheet 1

Inventor
MERWYN C. TEAGUE
By his Attorney

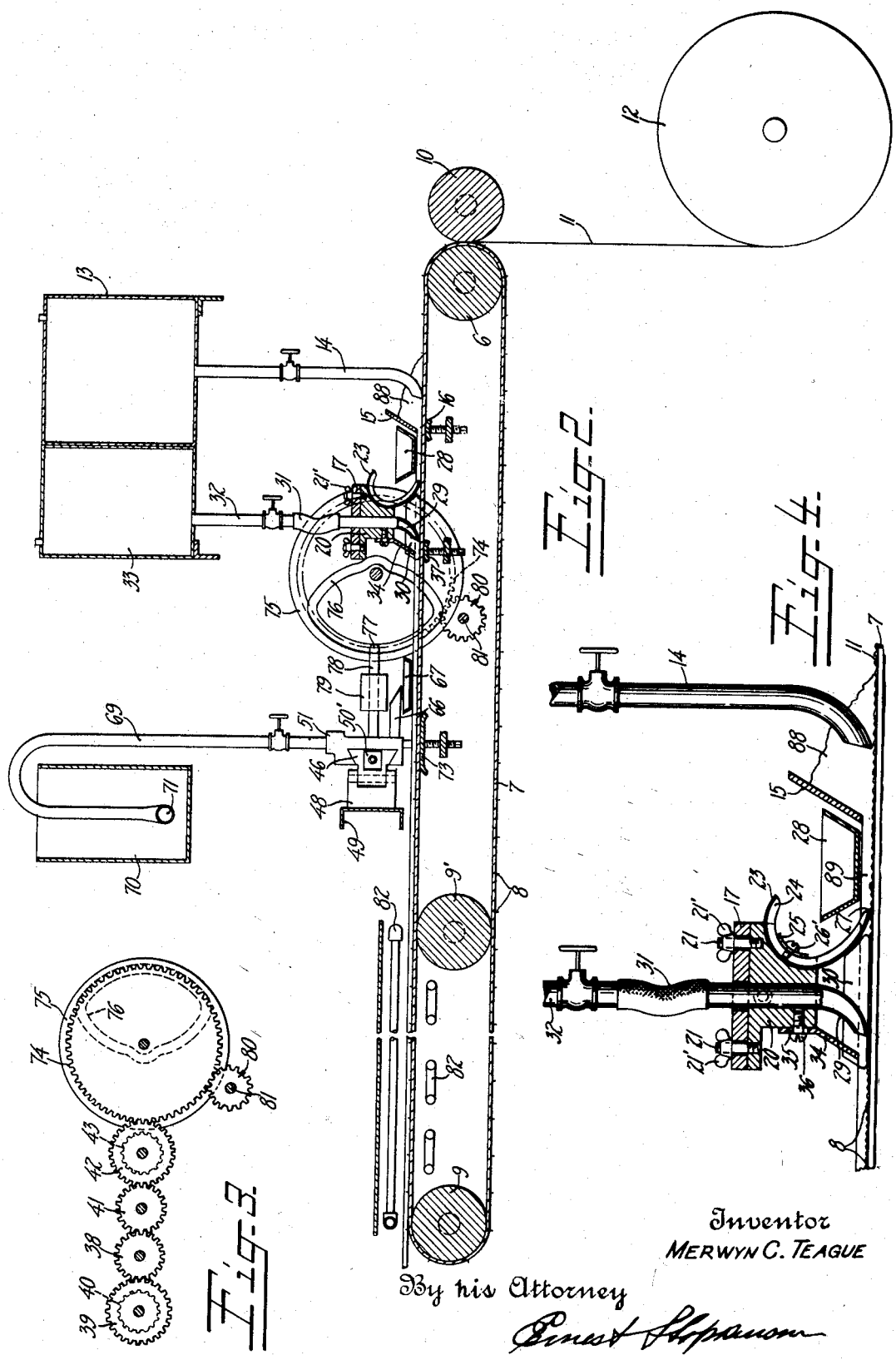

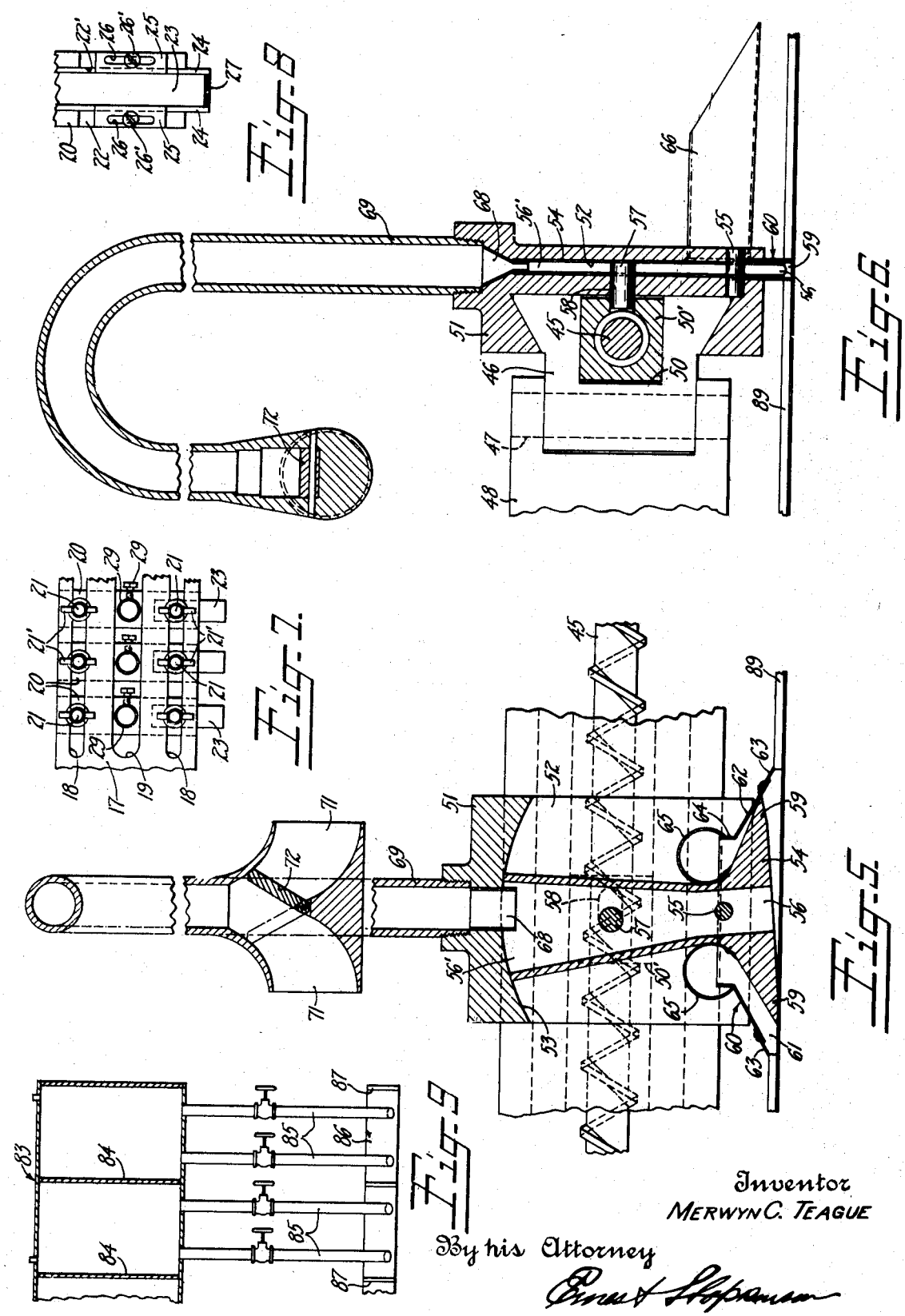

Patented Nov. 18, 1930

1,782,107

UNITED STATES PATENT OFFICE

MERWYN C. TEAGUE, OF ELMHURST, NEW YORK, ASSIGNOR TO THE MECHANICAL RUBBER COMPANY, OF CLEVELAND, OHIO, A CORPORATION OF NEW JERSEY

METHOD AND APPARATUS FOR MAKING INLAID SHEET MATERIAL

Application filed January 26, 1924. Serial No. 688,696.

This invention relates to a method and apparatus for making inlaid sheet material, more particularly a floor covering.

Inlaid floor covering has for many years been largely made from linoleum, but more recently a considerable amount of such covering embodying rubber has also been made. Plain linoleum is made by spreading the material in a loosely cohering or granular form on a backing, compacting the same, and then subjecting it to a drying or curing process for a considerable period. As a result of the materials used and the time and space required in its manufacture linoleum is a relatively expensive article. In order to obtain an inlaid linoleum different colored sheets of plain linoleum are sometimes cut into blocks of the desired pattern and size and these blocks then fitted together in a design to form the inlay; in another method the linoleum in its granular form is spread in different colors in an inlaid design on a backing by the use of stencils. Consequently inlaid linoleum is even more expensive than the plain variety. In the making of rubber floor covering the material may of course be distributed on a backing while in plastic form to provide a plain covering, but when it is desired to provide an inlaid covering this has previously been made as in the case of linoleum by forming different colored blocks of the rubber compound which must then be fitted together in the desired design. Owing largely therefore to the methods used for manufacture, inlaid floor coverings of any material are relatively expensive, while there is a large demand for an inlaid covering of comparative cheapness.

An object of my invention is to provide a rapid and economical method for continuously making an inlaid sheet of plastic material.

Another object is to provide a method for inlaying a relatively fluid plastic material.

Still another object is to provide a method for inlaying plastic material along predetermined lines to form a desired color design.

A further object is to provide a simple and inexpensive machine for carrying out the method.

The method consists broadly in distributing a relatively fluid plastic material in different colors in a predetermined design on a backing. The different colored material may either be laid directly in the desired design on a backing, or one or more colors of the material may be directly laid on the backing and portions of the material removed at predetermined intervals and replaced by other portions to form the required color design. The present embodiment of an apparatus for carrying out the method consists broadly of means for distributing plastic material in one or more colors on a backing, and means for removing and replacing portions of such material either longitudinally, transversely, or both longitudinally and transversely of the backing to produce a desired design.

For a detailed disclosure of the invention reference is had to the accompanying specification and drawings, in which latter:

Figure 2 is a longitudinal section of the same;

Figure 3 is a detail of the drive mechanism;

Figure 4 is an enlarged sectional detail of a portion of an inlay mechanism for producing certain color effects;

Figure 5 is an enlarged sectional detail of a portion of an inlay mechanism for producing other color effects;

Figure 6 is a central section at right angles to and viewed from the left of Fig. 5, but with the scraper oppositely tilted;

Figure 7 is a broken-away plan of a portion of the inlay mechanism shown in Fig. 4;

Figure 8 is an enlarged detail of a scraper, and

Figure 9 is a broken-away section of a modification of the main spreading apparatus.

Figure 1:
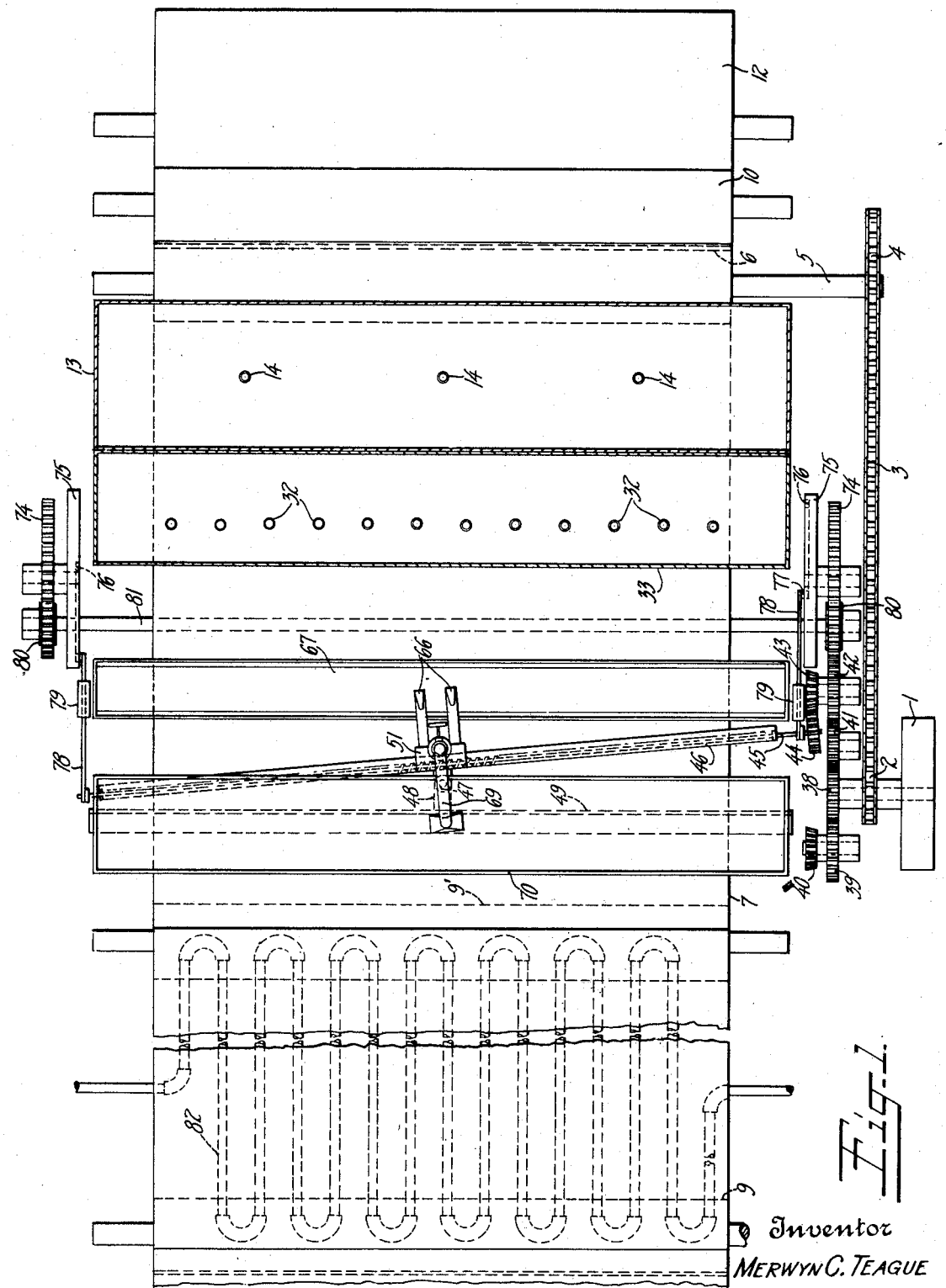
Figure 1 is a plan view, with the side frames and other parts omitted for the sake of clearness, of one form of an apparatus for carrying out the method.

In carrying out the method of the invention a backing of burlap or any other suitable material is provided, upon which the plastic covering material is to be distributed. This plastic material may be of any kind having characteristics suitable for the purpose for which the covering is designed and may be either a non-vulcanizable or a vulcanizable compound. Inlaid sheet material, however, is especially suitable for use as a floor covering owing to the fact that designs carried by the flooring are not obliterated by wear, and vulcanizable compounds have been found particularly applicable for flooring purposes. While a rubber compound containing the ordinary milled rubber softened by solvents may be used, it has been found particularly advantageous to use a rubber compound obtained by mixing rubber latex with other suitable ingredients. By the use of the latex a tough and elastic finished article is obtained, and the fire risks, expense and injury to health incident to the use of volatile rubber solvents are obviated. As an example of a suitable plastic material embodying rubber latex the following is given:

100 parts rubber (as concentrated latex containing 58% solids), 10 parts sodium silicate (52° Baumé), 100 parts ground flint or burnt clay, 100 parts zinc oxide, 50 parts mineral flour, 10 parts mineral oil, 10 parts silurian shale, 2 parts dibenzyl-amine, 2 parts carbon disulphide, 3 parts sulphur, 80 parts water.

This or any other suitable plastic material may be evenly distributed in one or more colors on the backing to form a background and a design inlaid thereon by removing portions of the background and replacing them by other portions to form the desired color design. In one embodiment of the invention this may be accomplished by running a scraping or cutting tool or tools across the material so as to remove one or more bands or ribbons of the material of desired widths and spaced at desired intervals, and then filling in the grooves or channels in the material by a similar compound in one or more different colors. If the material used is relatively stiff the walls of the channels formed may retain their position until the replacement material has been filled in. However, in order to obtain sharp lines, particularly with the use of a more fluid material, it is advisable to provide retaining means at each side of the scraping tools so as to retain the material in position on each side of the channel cut until the replacement material has filled in the channel. If it is desired to form a sheet in stripes the scraping tool or tools may be run longitudinally of the material forming the background so as to inlay thereon narrow or broad stripes of another or of several other colors. Or instead a tool or tools may be provided for forming stripes transversely of the material, either at right angles to its length or at an acute angle thereto, or if preferred both longitudinal and transverse stripes may be laid so as to divide the sheet up into figures. For instance if it is desired to simulate the appearance of a tile flooring the background material may be inlaid with narrow bands of another color crossing each other either at right angles or at an acute angle. If it is desired to form a sheet consisting wholly of longitudinal stripes these may either be laid directly on the backing by supplying streams of different colored plastic material in rear of a spreader, the streams being kept separate by partition walls; or instead a solid background of one color may be laid upon the backing and the stripes formed as before described by inlaying longitudinal stripes of the desired width and color on the background. Still another design may be formed by directly and simultaneously distributing different colored materials to form stripes, and then inlaying upon these additional longitudinal or transverse stripes, or both. Suitable spreaders may be utilized for uniformly distributing the material of the background or of the stripes.

After spreading the material as above indicated the sheet may be heated to dry the material and then pressed and cured. If the compound used, such as in the example given, contains ingredients for accelerating the cure at reduced temperature the material after drying may be first passed through pressure rolls and then allowed to cure, or the cure may be hastened by a moderate heat. If a compound requiring elevated temperatures for curing is used the dry sheet material may be pressed and cured simultaneously in a belt press. Of course in the case of non-vulcanizable compounds the material after distributing and inlaying in the desired design may be treated, according to the nature of the compound used, to finish it.

In the annexed drawings there is shown one embodiment of an apparatus for carrying out the method, and in said drawings (Figs. 1 and 2) the numeral 1 designates a main drive pulley which may be connected to any suitable source of power, and the shaft of which carries a sprocket 2 connected by a chain 3 to a sprocket 4 mounted on the shaft 5 of a conveyor drive roll 6, over which latter passes a conveyor 7 which is preferably provided with short studs 8. At the opposite end of its run the conveyor passes over an idler roll 9, and at an intermediate point its upper portion is supported by another idler roll 9'. Cooperating with the drive roll 6 is a pressure roll 10 for assisting in the feed of a backing sheet 11 supplied from a roll 12. This backing sheet may be of burlap or any other suitable material, and by reason of the pressure roll 10 penetration of the studs 8 partly within the backing is insured, so that the backing passes beneath the spreading apparatus, to be later described, while held under a uniform tension.

*Main spreading mechanism.*—Disposed above the conveyor adjacent the supply end thereof is a receptacle 13 for plastic material to be distributed on the backing as a background. This material should be of such consistency as to flow, either when under a sufficient head or if necessary under air or other pressure. Leading from the bottom of the receptacle 13 are valve controlled pipes 14 which discharge the material adjacent the backing on the conveyor, and by means of the spreader 15 the material is uniformly distributed over the backing. Cooperating with the spreader 15 is a narrow adjustable table 16 disposed beneath the upper half of the conveyor, by means of which the conveyor and backing may be held in proper position relative to the spreader 15.

*Longitudinal inlay mechanism.*—Extending across the machine in rear of the spreader 15 is a supporting plate 17 which is provided (see Fig. 7) with longitudinal slots 18 adjacent its edges and with a central slot 19. Adapted to be adjustably secured to the plate 17 are a series of blocks 20 each of which carries an inlaying unit, and as these blocks and inlaying units are identical but one of them will be described. Each block 20 is provided on its top with threaded pins 21 adapted to project through the slots 18, and threaded on each pin is a thumb nut 21' by means of which the blocks may be supported in any desired spacing on the plate 17, which construction also allows of the ready exchange of the inlaying units when desired. Each block 20 is cut away at one side to form a curved face 22 (see Fig. 8), in which is formed a groove or channel 22' adapted to receive a curved scraper 23 which is provided with side walls 24. The depth of the groove 22' is substantially the same as the height of the side walls 24 of the scraper, and these walls are provided with the curved ears 25 adapted to lie against the curved face 22. Each ear is provided with a slot 26 through which projects a set screw 26' threaded into the block 20. It will be seen that by the construction described each scraper 23 may be adjusted in its groove to vary the position of its sharpened lower scraping edge 27, which edge is ordinarily set in such a position as to scoop out a band or ribbon of the background of plastic material distributed by the spreader 15, care being taken, however, to avoid contact with the backing 11. Extending transversely across the conveyor below the upper ends of the scrapers 23 and in position to receive the material discharged by them is a pan 28. If desired, however, the material may be discharged on a transversely moving conveyor. Slightly in rear of and in alignment with each scraper 23 is a plastic inlay material supply nozzle 29, the lower or discharge end of which, as shown in Figs. 2 and 4, is somewhat flattened and bent in the direction of movement of the backing, and secured to each side of the nozzle is a thin retaining plate 30 the forward end of which extends close to the scraper 23, the purpose of these plates being to prevent collapse of the adjacent plastic material into the groove or channel formed therein by the scraper 23. The nozzle 29 is adjustably held in its supporting block 20 by the set screw 29', and at its upper end it extends through the slot 19 and is provided with a section of flexible pipe 31 which is connected to a valved supply pipe 32, the purpose of which flexible section is to allow of lateral adjustment of the block 20. Each supply pipe 32 leads into a receptacle 33 for plastic inlay material. When it is desired to inlay material in two or more colors this receptacle will of course be suitably divided into compartments for the various colors. Disposed in rear of the nozzle 29 is a smoothing or spreading knife 34 of substantially the width of the channel formed by the scraper 23, this spreader knife being provided with a slot 35 adjacent its upper end, through which extends a set screw 36 threaded into the block 20, by means of which the knife may be vertically adjusted. The rear ends of the retaining plates 30 extend slightly beyond the smoothing knife 34 so that the latter in leveling the inlaid material will not spread it beyond the channel formed for the material. Cooperating with the spreader knife 34, nozzle 29 and scraper 23 is a narrow adjustable table 37 by means of which the conveyor and backing 11 are maintained in proper position relative to the inlaying devices just described.

*Transverse inlay mechanism.*—Secured on the same shaft with pulley 1 and sprocket 2 is a gear 38 which meshes at one side with a gear 39 (Figs. 1 and 3), while rigid on the shaft of gear 39 is a bevelled gear 40, the purpose of which will be later described. Meshing with the gear 38 on its opposite side is an idler gear 41, which in turn meshes with a gear 42, on the shaft of which latter is a bevelled gear 43 similar to the gear 40. The proportions are such that gears 40 and 43 are driven at the same speed but in opposite directions. Adapted to mesh with either of the gears 40 or 43 is a gear 44 rigid on a screw rod or shaft 45, which latter adjacent each end is journaled in a cross bar 46 pivotally mounted at its middle portion at 47 on a supporting block 48 carried by a fixed frame 49 extending transversely across the machine. Formed in one side of the bar 46 is a groove or slideaway 50, in which is movable a nut 50' threadedly connected to the screw rod 45. Carried by the bar 46 is a supply head 51 having a dovetailed slide connection therewith as shown in Fig. 6. The supply head is provided with a flattened slot 52 extending therethrough from side to side, the upper wall of which slot is curved on a circular arc as shown at 53 (Fig. 5).

Disposed in the slot 52 is a plastic material inlay device 54, which is pivotally or tiltably mounted in the supply head by the pivot pin 55 passing through the walls of the device and fixed in the supply head. The inlay device is provided with a nozzle having a flattened bore or discharge opening 56 the upper portion of which is expanded as shown at 56', and the upper end of the device is formed on a curved arc closely and slidably fitting the curved wall 53. The inlay device is connected to the nut 50' by a pin 57 fixed in the nut and in the walls of the device but movable in a slot 58 formed in the supply head 51 in rear of the slot 52. Adjacent its lower end the inlay device is formed with the inclined scrapers 59 terminating in a sharp edge, which scrapers extend on opposite sides of the discharge opening 56. Surrounding the lower end of the inlay device is a casing 60 extending within the supply head 51 and secured thereto.

This casing is formed with extended side walls 61 disposed at each side of the scrapers 59 and adapted to extend within the plastic material to the depth of the channel formed by the scrapers. These side walls are connected by inclined end walls 62 which terminate short of the ends of the side walls 61, and adjustably connected to the lower ends of the walls 62 are smoothing or spreader plates 63 substantially of the width of the channel formed by the scrapers 59. The upper portion of the casing 60 is provided with a vertical extension 64 which is open at the top. Disposed at each side of the inlay device above the scrapers 59 are approximately circularly curved spring plates 65 of a width to closely fit within the slot 52, these plates being secured at one end to the inlay device while their opposite ends are free and adapted to bear against the end walls of the extension 64. Secured in the front wall of the supply head 51 are discharge nozzles 66 for the scraped-up material, the inner ends of which nozzles are substantially in alignment and communicate with the spaces within the spring plates 65, the forward wall of the extension 64 being cut away to allow the scraped-up material to freely pass from the space within each spring plate 65 into its corresponding discharge nozzle. The outer ends of the discharge nozzles 66 terminate above a transversely extending collecting pan 67, but as in the case of the pan 28 a transversely extending conveyor may be substituted if desired. Disposed in the upper end of the supply head 51 is a flattened funnel 68, the lower portion of which extends downwardly within the upper expanded portion 56' of the bore of the inlay device. Secured in the upper end of the supply head 51 is a plastic inlay material supply pipe 69 discharging into the funnel 68. This supply pipe is in the form of a siphon the inlet arm of which extends within and is freely movable across a transversely extending plastic inlay material receptacle 70. Owing to the nature of the material its fluidity may not be great enough to properly supply the inlay device 54 by siphonic action alone, and the inlet end of the siphon is therefore provided with the enlarged oppositely extending openings 71, at the junction of which openings a flap valve 72 is disposed. By reason of this construction the plastic inlay material is forced into one or the other of the openings 71 under pressure as the end of pipe 69 moves within the receptacle 70. However, the receptacle 70 may also be placed under air or other pressure if desired to assist the flow of the material.

Cooperating with the transverse inlay device below the conveyor is an adjustable table 73 by which the conveyor and the supported backing sheet and plastic material may be properly disposed with relation to the inlay device.

It is obvious that if desired the transverse inlays may be made by intermittently stopping the conveyor 8 and then moving the transverse inlay mechanism at the desired angle across the sheet. However, for the sake of greater speed and uniformity it is preferred to move the sheet continuously, and in this case the inlay mechanism must be given a longitudinal component of motion as well as a transverse one to allow for the movement of the sheet. This component will of course vary in accordance with the relative speeds of the sheet and inlay mechanism. For this purpose a gear 74 is provided which meshes with gear 42, and on the shaft of gear 74 there is secured a side face cam 75 having therein a cam groove 76 in which is movable a cam follower 77 carried by a connecting rod 78, this rod passing through a guide 79 and having a pivotal connection at its other end with the screw rod or shaft 45. Meshing with the lower side of gear 74 is a gear 80 the shaft 81 of which extends through to the opposite side of the machine and is there provided with a second gear 80 meshing with a gear 74, on the shaft of which latter is a cam 75 and operating connections to the opposite end of screw shaft 45 in all respects similar to those just described.

Disposed in rear of the transverse inlay mechanism are upper and lower heating and drying coils 82, between which the material carried by the conveyor passes and is then removed from the machine.

In Fig. 9 there is shown a slight modification of the main spreading apparatus, which is suitable for inlaying the plastic material on a backing directly in the form of adjoining stripes of any desired width and color. Instead of using a single compartment tank, the tank 83 is divided into a plurality of compartments by the partitions 84, in which may be placed plastic material of the desired colors. This material is led from the various compartments through the valved supply pipes 85 down in rear of a spreader 86 corresponding in all respects to the spreader 15 except that it is provided with rearwardly extending partitions 87. By suitably spacing these partitions and by arranging various colored plastic materials in the compartments of the tank stripes of any desired width and coloring may be inlaid without using the other inlay mechanisms.

In carrying out the method by the above described machine a backing sheet 11 of burlap or any other suitable material is fed between the rolls 6 and 10, so that by reason of studs 8 the backing is held under uniform tension on the conveyor 7 as it passes through the machine. The backing sheet then passes beneath the bank of plastic material 88 in rear of the spreader 15 and issues from beneath said spreader with a uniformly spread layer 89 of the plastic material thereon. As this sheet moves rearwardly of the machine the scrapers 23 remove bands or strips of the background material, which bands or strips pass up the curved bottoms of the scrapers and are discharged into the pan 28. If the plastic material is of such consistency that it immediately tends to fill the channels formed by the scrapers 23 the side walls 30 attached to the nozzles 29 prevent such action, and in the further movement of the sheet on the conveyor the nozzles 29 discharge bands of plastic material of another color or colors into the channels, which bands are then flattened or spread by the spreading knives 34. In case where it is desired to provide a very thick inlaid material the sheet may be sometimes run through the main spreading apparatus more than once, and in order that the longitudinal inlay mechanism may properly function with background sheets of different thickness or in case where it is desired to inlay only to a part of the depth of the background, it is desirable that the inlay mechanism be adjustable. It will be seen from the previous description that the scraper 23 may be adjusted by means of the set screws 26' to cut a groove or channel at any desired depth in the background material, and by means of the set screws 29' the inlay nozzles 29 can be set to discharge at various depths in the channels formed by the scrapers, while by means of the set screws 36 the spreader knives 34 may also be adjusted in accordance with the thickness of the background material. By means of the thumb nuts 21' the supporting blocks 20 carrying each inlaying unit may be laterally adjusted to space the longitudinal inlay strips at any desired distance. Moreover, these blocks may be readily removed and others for inlaying strips of greater or less width quickly substituted.

From the longitudinal inlay mechanism the sheet passes to the transverse inlay mechanism, which in the construction shown is moved alternately in opposite directions from the sides of the machine. Due to the rotation of the screw shaft 45 the nut 50' is moved laterally in the channel 50 in cross bar 46, and by reason of the pin connection 57 the supply head 51 and the transverse inlay device are carried with the nut. It will be seen that by reason of the slot 58 in the rear wall of the supply head the first effect of the nut 50' in its movement from one side of the machine is to tilt the inlay device on its pivot pin 55 through the pin 57, thereby disposing said device for instance in the position shown in Fig. 5. In this position the left hand scraper 59 is depressed so as to move laterally just above the backing sheet and remove a band of the background and longitudinal stripe material, which material passes upwardly into the space within the spring plate 65 and then out through the corresponding nozzle 66, from which it is discharged into the pan 67. At the same time the plastic material for the transverse inlay is forced under pressure into the inlet 71 of the siphon feed pipe 69 and then passes through the funnel 68 into the enlarged upper end 56' of the bore 56. Owing to the lateral tilting of the inlay device the material then flows freely out in a rearward direction into the channel formed by the scraper 59. The side walls 61 of the casing 60 maintain the material forming the walls of the channel in position until the channel is filled up by the transverse inlay material, and by adjustment of the spreading plate 63 the inlaid strip is properly smoothed. The thickness of the background material and of the inlays can also be controlled by adjustment of the tables 16, 37 and 73. It will be seen that during movement to the left as shown in Fig. 5 the right hand scraper 59 is moved up out of operative position against the wall 62 so as to close the channel leading to the space within the right hand spring plate 65. While the transverse inlay mechanism is moving across the sheet the cam followers 77 are moving in the dwells of the cams 75, but as soon as the inlay mechanism reaches the end of this movement the cam followers move off of the dwells and through the connecting rods 78 swing the cross bar 46 on its pivot so as to shift the gear 44 from one of its driving gears to the other and also reverse its movement and that of the screw rod 45. Upon reversal of the movement of the screw rod 45 the inlay device is first tilted upon its pivot to raise the left hand scraper 59 and render the right hand one operative and the inlay mechanism then travels back across the sheet again. By properly varying the relative speeds of the conveyor and of the screw rod 45 and by using different actuating cams 75 the transverse inlay mechanism can be caused to inlay the transverse strips either at right angles to the direction of movement of the sheet or at acute angles thereto. If desired two transverse inlay mechanisms, each operative in one direction only, may be substituted for that shown, or two or more such mechanisms as that shown may be employed to lay transverse inlays of different colors, or by using two transverse inlay mechanisms inlaying in oppositely inclined directions with respect to the path of movement of the sheet the background material may be inlaid with another color dividing it off into diamond shape portions. The inlaid sheet then passes between the heating coils 82, and if it is of such a nature as to require heating or drying such treatment can be given by the coils. The sheet then passes from the machine and if desired it is further dried after which it is preferably rolled or pressed to compact the material, and if formed of a nonvulcanizable compound is given such further treatment as may be required, while if a vulcanizable material has been used it is vulcanized in the manner previously described.

It will be seen that by the method and apparatus of my invention an inlaid floor or other covering may be cheaply, quickly and continuously made in a large number of color designs directly from a plastic material without the use of stencils or the necessity of building up the design from blocks of previously completed material. While in the particular example given the plastic material described is a vulcanizable compound, specifically one made with rubber latex, it is evident that any compound having the necessary plasticity and the characteristics required in the finished article may be used.

While a specific embodiment of the method and of an apparatus for carrying it out have been described, it is obvious that with the disclosure made numerous modifications will suggest themselves to those skilled in the art and it is therefore not desired to limit the invention otherwise than as set forth in the appended claims.

Having thus described my invention, what I claim and desire to protect by Letters Patent is:

1. The method of making an inlaid floor or other covering which consists in forming a paste of covering material, continuously distributing the covering material in a predetermined inlaid color design on one surface of a moving backing, removing fluid from the material, and compacting the material.

2. The method of making an inlaid floor or other covering which comprises distributing a coherent plastic covering material in a sheet on a backing, removing portions of the material from the backing and replacing them with portions differing in color to form a predetermined design, and afterward pressing to compact the material.

3. The method of making an inlaid floor or other covering which comprises spreading a relatively fluid plastic covering material in a sheet on a backing, removing portions of the spread material from the backing and simultaneously replacing them with portions differing in color to form a predetermined design, and afterward compacting the material.

4. The method of making an inlaid floor or other covering which comprises continuously spreading a relatively fluid plastic rubber compound in different colors in a predetermined inlaid design on one surface of a moving backing, and compacting and vulcanizing the material.

5. The method of making an inlaid floor or other covering which comprises continuously and successively distributing different colored relatively fluid plastic covering compounds embodying rubber in a predetermined inlaid design on one surface of a moving backing, and compacting and curing the material.

6. The method of making an inlaid floor or other covering which comprises distributing a coherent plastic covering material embodying rubber in a sheet on a backing, removing portions of the spread material and replacing them with portions differing in color to form a predetermined design, then pressing to compact the material, and curing.

7. The method of making an inlaid floor on other covering which consists in spreading a relatively fluid plastic covering material comprising rubber latex in a sheet on a backing, removing portions of the spread material in a predetermined design while maintaining the adjoining material in position and simultaneously replacing said portions with portions differing in color, and then pressing and curing the material.

8. The method of making an inlaid floor or other covering which comprises distributing a mobile rubber compound in a sheet on a backing, cutting away spaced portions of the sheeted compound from the backing along straight lines, simultaneously replacing them with portions of another color, and then compacting and curing the material.

9. The method of making an inlaid floor or other covering which comprises distributing a relatively fluid plastic compound in a sheet on a backing, removing portions of the sheeted compound while maintaining the adjoining edges of the fluid material in position, replacing said portions with portions differing in color, and compacting the material.

10. The method of making an inlaid floor or other covering which comprises distributing a relatively fluid plastic compound embodying rubber in a sheet on a backing, cutting away portions of the compound along intersecting lines, replacing said portions with portions differing in color, and then compacting and curing the material.

11. The method of making an inlaid floor or other covering which comprises spreading a relatively fluid plastic compound embodying rubber in a sheet on a backing, successively removing portions of the fluid material along intersecting straight lines, simultaneously with the removal of each portion replacing it with a portion of another color, and compacting and curing the material.

12. The method of making an inlaid floor or other covering which comprises spreading a relatively fluid plastic compound embodying rubber latex on a backing, successively cutting away portions of the material along intersecting lines while maintaining the adjacent fluid material in position, simultaneously with the removal of each portion replacing it with a portion of another color, and then compacting and curing the material.

13. An inlaying machine for plastic material comprising means for distributing colored plastic material on a backing, and means for removing a portion of the material longitudinally of the backing and simultaneously replacing the same by material differing in color.

14. An inlaying machine for plastic material comprising means for distributing colored plastic material on a backing, and means for removing a portion of the material laterally of the backing and simultaneously replacing the same by material differing in color.

15. An inlaying machine for plastic material comprising means for distributing colored plastic material on a backing, and means for removing portions of the material longitudinally and laterally of the backing and simultaneously replacing the same by material differing in color.

16. An inlaying machine for plastic material comprising means for feeding a backing, means for distributing colored coherent plastic material in a substantially plastic state thereon, and means for inlaying material of different color onto the plastic material on intersecting straight lines.

17. An inlaying machine for plastic material comprising means for distributing plastic material of one color on a moving backing, stationary means for continuously removing a portion of the material and replacing the same by material of another color, and additional means movable in predetermined relation to said backing for removing a portion of the material and replacing same by material of another color.

18. An inlaying machine for plastic material comprising means for continuously feeding a backing, means for distributing colored plastic material thereon, and means movable in predetermined lateral relation to said backing for distributing thereon material differing in color to form a predetermined inlaid design.

19. An inlaying machine for plastic material comprising means for feeding a backing, means for distributing colored plastic material thereon, and spaced means disposed transversely of the backing for removing portions of the material and simultaneously replacing them by material differing in color.

20. An inlaying machine for plastic material comprising means for feeding a backing, means for distributing colored plastic material thereon, means movable transversely of the backing for inlaying thereon material of another color, and means for simultaneously imparting to said last means a movement longitudinally of the backing.

21. An inlaying machine for plastic material comprising means for supporting a backing, and means for distributing plastic material of different colors in predetermined inlaid arrangement on the backing by continuous relative lateral movement of the backing and distributing means.

22. An inlaying machine for plastic material comprising means for supporting a backing, and means laterally movable relatively to each other for distributing plastic material of different colors in predetermined inlaid arrangement on the backing by relative movement of the backing and distributing means.

23. An inlaying machine for plastic material comprising means for continuously feeding a backing, means for distributing plastic material thereon, plastic material delivery means alternately movable in opposite directions across said backing, and means for synchronously varying the direction of delivery of said material.

24. An inlaying machine for plastic material comprising means for continuously feeding a backing, means for distributing colored plastic material thereon, and means for inlaying plastic material of another color thereon at right angles to the sides of said backing.

25. An inlaying machine for plastic material comprising means for continuously feeding a backing, means for distributing plastic material thereon, scraper means alternately movable in opposite directions across said backing for removing a portion of said material, and plastic material delivery means for replacing with material of another color the portion removed and operable in unison with said scraper means.

26. An inlaying machine for plastic material comprising means for continuously feeding a backing, means for distributing a colored plastic material thereon, means movable across said backing for inlaying thereon plastic material of another color, an extended receptacle for said second material, and a supply conduit for said inlaying means extending into said receptacle and freely movable therein.

27. An inlaying machine for plastic material comprising means for continuously feeding a backing, means for distributing a colored plastic material thereon, means movable in a plurality of directions across said backing for inlaying thereon plastic material of another color, an extended receptacle for said second material, a supply conduit for said inlaying means extending into said receptacle and freely movable therein, and means whereby the material may be conducted into said conduit under pressure irrespective of its direction of movement.

28. An inlaying machine for plastic material comprising means for continuously feeding a backing, means for distributing a colored plastic material thereon, means movable across said backing for inlaying material of another color thereon in a predetermined design, a receptacle for the inlay material, and a supply conduit rigidly carried by said inlaying means and having its intake end freely movable in said receptacle, said end having opposed inlets, and control means for said inlets governed by the direction of movement of said end.

29. An inlaying machine for plastic material comprising means for continuously feeding a backing, means for distributing colored plastic material thereon, a support disposed transversely of said backing, means for varying the angular position thereof, means movable on said support for inlaying material of another color on said backing, and means for alternately moving said last means in opposite directions.

30. An inlaying machine for plastic material comprising means for continuously feeding a backing, means for distributing colored plastic material thereon, a pivotally supported screw rod disposed transversely of said backing, means for alternately rotating said rod in opposite directions, means for varying the angular position of said rod on its pivot, and means for distributing plastic material threadedly connected to said rod.

31. An inlaying machine for plastic material comprising means for distributing plastic material on a backing, and means for inlaying plastic material thereon including a supply head movable over said backing in predetermined relation thereto, and combined scraper and inlay means movably carried by said head and governed in operation in accordance with the direction of movement of said head.

32. An inlaying machine for plastic material comprising means for distributing plastic material on a backing, and means for inlaying plastic material thereon including a supply head, means for moving the latter over the backing, a nozzle pivotally mounted on said head, scrapers and discharge means therefor carried by said nozzle, and means for actuating said nozzle, scrapers and discharge means in accordance with the movements of said head.

33. An inlaying machine for plastic material comprising means for distributing plastic material on a backing, and means for inlaying plastic material thereon including a supply head, a nozzle pivotally mounted thereon, scrapers on opposite sides of said nozzle, discharge means adapted to be operatively connected with said scrapers, means for alternately moving said supply head in opposite directions, and means actuated thereby for alternately oppositely moving said nozzle on its pivot to render one of said scrapers and its discharge means operative.

34. An inlaying machine for plastic material comprising means for continuously feeding a backing, means for distributing plastic material thereon, a scraper device for removing a portion of the material movable alternately in opposite directions across said backing, said device having oppositely directed edges, means for alternately presenting said edges to the material, and means for supplying plastic material to replace the portion removed.

35. An inlaying machine for plastic material comprising means for continuously feeding a backing, means for distributing plastic material thereon, a tiltable scraper device having oppositely disposed scraping edges for removing part of said material, means for moving said device alternately in opposite directions across said backing, means governed by the direction of movement for rendering one or the other of said scraping edges operative, and means for supplying plastic material in rear of the operative edge.

36. An inlaying machine for plastic material comprising means for continuously feeding a backing, means for distributing colored plastic material thereon, adjustable spaced means for removing portions of said material longitudinally of the backing, replacing them by material differing in color and smoothing the latter, a support extending across said backing, means for varying its angular position, and means alternately movable in opposite directions on said support for removing part of the material, replacing it by other material and smoothing the latter.

Signed at New York, county and State of New York, this 23 day of January, 1924.

MERWYN C. TEAGUE.